(12) United States Patent
Gieras et al.

(10) Patent No.: US 9,729,036 B2
(45) Date of Patent: Aug. 8, 2017

(54) PERMANENT MAGNET MACHINE FOR INTEGRATED STARTER GENERATOR

(71) Applicant: Hamilton Sundstrand Corporation, Windsor Locks, CT (US)

(72) Inventors: Jacek F. Gieras, Glastonbury, CT (US); Gregory I. Rozman, Rockford, IL (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 681 days.

(21) Appl. No.: 13/836,859

(22) Filed: Mar. 15, 2013

(65) Prior Publication Data

US 2014/0265693 A1 Sep. 18, 2014

(51) Int. Cl.
| | | |
|---|---|---|
| *H02K 47/00* | (2006.01) | |
| *H02K 3/20* | (2006.01) | |
| *H02K 23/04* | (2006.01) | |
| *H02K 21/26* | (2006.01) | |
| *H02K 21/04* | (2006.01) | |
| *H02P 9/00* | (2006.01) | |
| *H02K 19/38* | (2006.01) | |
| *H02P 9/30* | (2006.01) | |

(Continued)

(52) U.S. Cl.
CPC ............ *H02K 21/04* (2013.01); *H02K 19/38* (2013.01); *H02P 9/00* (2013.01); *H02P 9/302* (2013.01); *H02P 9/34* (2013.01); *H02P 2101/30* (2015.01)

(58) Field of Classification Search
CPC ................................ H02K 1/08; H02K 15/12

USPC .... 310/113, 154.02, 154.27, 154.28, 154.32, 310/154.42, 154.43, 154.49, 181, 190
See application file for complete search history.

(56) References Cited

U.S. PATENT DOCUMENTS

| | | | |
|---|---|---|---|
| 5,581,168 A | 12/1996 | Rozman et al. | |
| 6,051,951 A * | 4/2000 | Arai | B60K 6/26 |
| | | | 180/65.1 |

(Continued)

FOREIGN PATENT DOCUMENTS

| | | |
|---|---|---|
| DE | 102008006328 A1 | 10/2013 |
| EP | 2372901 A2 | 10/2011 |

OTHER PUBLICATIONS

Gieras, J.F. "Analytical method of calculating the electromagnetic field and power losses in ferromagnetic halfspace, taking into account saturation and hysteresis." Proceedings IEE, UK, vol. 124, 1977, No. 11, pp. 1098-1104.

(Continued)

*Primary Examiner* — Jose Gonzalez Quinones
(74) *Attorney, Agent, or Firm* — Kinney & Lange, P.A.

(57) ABSTRACT

An integrated starter-generator (ISG) system includes a flux-regulated permanent magnet machine (PMM), a wound-field synchronous machine, and a control coil controller. The flux-regulated PMM includes a stationary portion having a control coil and a plurality of permanent magnets, and a rotating portion that includes rotating armature windings. The wound-field synchronous machine includes a stationary portion that includes a main armature winding and a rotating portion that includes a main field winding that receives excitation from the flux-regulated PMM. The control coil controller controls current supplied to the control coil of the flux-regulated PMM to selectively control magnetic flux presented to the rotating armature windings.

7 Claims, 3 Drawing Sheets

(51) Int. Cl.
*H02P 9/34* (2006.01)
*H02P 101/30* (2015.01)

(56) References Cited

U.S. PATENT DOCUMENTS

| | | | |
|---|---|---|---|
| 6,563,244 B1* | 5/2003 | Yamauchi et al. | 310/90.5 |
| 6,864,608 B2* | 3/2005 | Kang et al. | 310/154.02 |
| 7,777,384 B2 | 8/2010 | Gieras et al. | |
| 7,843,155 B2 | 11/2010 | Rozman et al. | |
| 8,085,003 B2 | 12/2011 | Gieras et al. | |
| 8,148,866 B2 | 4/2012 | Shah | |
| 8,148,867 B2 | 4/2012 | Gieras et al. | |
| 2002/0084714 A1* | 7/2002 | Fujita | 310/181 |
| 2003/0025418 A1 | 2/2003 | Kang et al. | |
| 2005/0184698 A1* | 8/2005 | Anghel | H02P 6/185 318/715 |
| 2006/0279086 A1* | 12/2006 | Kishibata et al. | 290/31 |
| 2009/0160391 A1* | 6/2009 | Flynn | 318/701 |

OTHER PUBLICATIONS

European Search Report dated Oct. 29, 2015, for corresponding European Patent Application No. 14159408.5.

* cited by examiner

PERMANENT MAGNET MACHINE FOR INTEGRATED STARTER GENERATOR

BACKGROUND

The present invention is related to starter-generators, and in particular to a starter-generator that utilizes a permanent magnet exciter.

A generator converts mechanical energy to electrical energy. A motor converts electrical energy to mechanical energy. From a mechanical standpoint, the main difference between a generator and a motor is the direction in which energy flows. Applications that require motoring operations and generating operations, an integrated motor-generator can meet both requirements via a single device. The motor-generator is used in a motoring mode to convert electrical energy to mechanical energy, and in a generating mode to convert mechanical energy to electrical energy. In aircraft applications, a motor referred to as a starter is required to provide mechanical force to the engines for starting. Thus, in aircraft applications, the motor-generator is commonly referred to as a starter-generator.

A typical integrated starter-generator (ISG) includes a main wound-field synchronous machine, an exciter, and a sub-exciter. During operation in the generating mode, the sub-exciter generates electric power that is provided as excitation to the exciter. Typically, the sub-exciter is a permanent magnet generator utilizing a permanent magnet rotor and three-phase stator. When rotating, the permanent magnet rotor induces an alternating current voltage on the three-phase stator that is rectified and provided as a direct current (DC) voltage to the exciter, causing current to build up in the stationary exciter field winding. The current through the exciter field winding induces an AC voltage on the rotating exciter armature windings. The AC voltage is rectified and provided as a DC voltage to a rotating main field winding, which causes current to build through the main field winding. The current through the main field winding induces an AC voltage on the main armature windings of the ISG. The voltage provided on the main armature windings of the ISG is regulated by controlling the current supplied to the exciter field winding. Increasing the current through the exciter field winding increases the generator output voltage, while decreasing the current through the exciter field winding decreases the generator output voltage.

During the motor mode, rather than generate AC voltage at the main armature winding, an AC voltage is applied to the main armature winding. The interaction between the magnetic field created by the main armature winding and the magnetic field created by an energized main field winding results in mechanical energy (in the form of rotation) being applied to the rotating portion of the ISG.

SUMMARY

An integrated starter-generator (ISG) system includes a flux-regulated permanent magnet machine (PMM), a wound-field synchronous machine, and a control coil controller. The flux-regulated PMM includes a stationary portion having a control coil and a plurality of permanent magnets, and a rotating portion that includes rotating armature windings. The wound-field synchronous machine includes a stationary portion that includes a main armature winding and a rotating portion that includes a main field winding that receives excitation from the flux-regulated PMM. The control coil controller controls current supplied to the control coil of the flux-regulated PMM to selectively control magnetic flux presented to the rotating armature windings.

DETAILED DESCRIPTION

Figure 1:
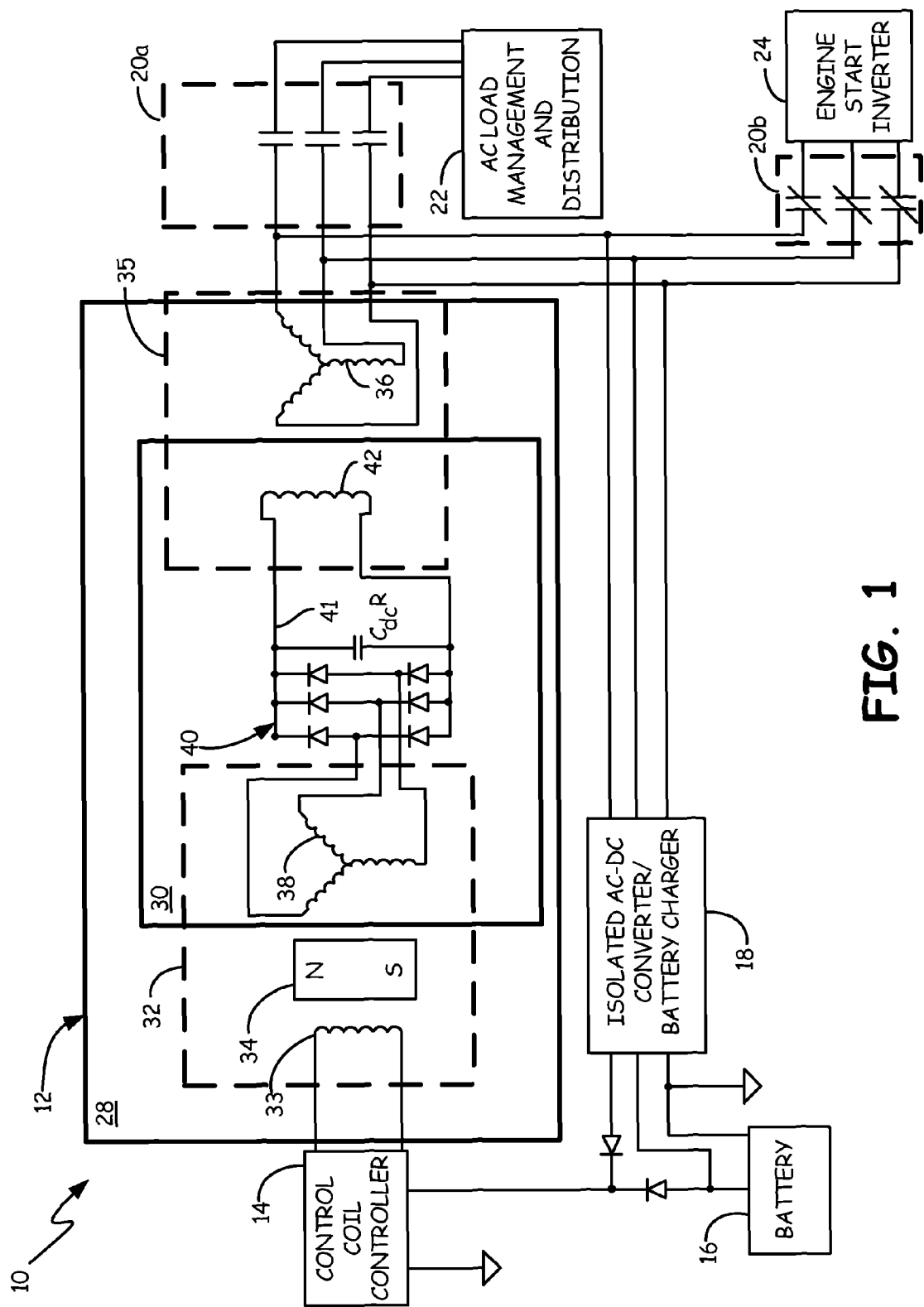
FIG. 1 is a circuit diagram of a wound-field integrated starter-generator (ISG) that utilizes a flux-regulated permanent magnet machine (PMM) according to an embodiment of the present invention.

FIG. 1 is a circuit diagram of wound-field integrated starter-generator (ISG) system 10 having a flux-regulated permanent magnet machine (PMM) according to an embodiment of the present invention. System 10 includes integrated starter-generator (ISG) 12, control coil controller 14, battery 16, isolated AC-DC converter/battery charger 18, main output contactors 20a and 20b, AC load management and distribution system 22, and engine start inverter 24. ISG 12 includes stationary portion 28 and rotating portion 30, and two separate electromechanical machines: flux-regulated PMM 32 and wound field synchronous machine 35. Flux-regulated PMM 32 includes control coil 33 and permanent magnets 34 located on stationary portion 28 and exciter armature windings 38 located on rotating portion 30. Wound field synchronous machine 35 includes main armature winding 36 located on stationary portion 28 and main field winding 42 located on rotating portion 30. In addition, flux-regulated PMM 32 is connected to provide excitation to wound-field synchronous machine 35 via rotating rectifier 40 and DC link bus 41 located on rotating portion 30.

In a generate mode, magnetic flux provided by permanent magnets 34 interacts with rotating PMG windings 38 to induce an AC voltage on PMG windings 38. Rotating rectifier 38 rectifies the AC voltage and provides the rectified voltage to main field winding 42 via DC link bus 41. The DC voltage applied to main field winding 42 causes current to build in main field winding 42, which induces an AC voltage in main armature winding 36. The AC output voltage of ISG 12 is provided to AC load management and distribution system 22 via main output contactors 20a. In a typical ISG, the generator output voltage is regulated by regulating the current through an exciter field winding. In the embodiment shown in FIG. 1, the exciter field winding has been replaced with control coil 33 and permanent magnets 34. The magnetic flux provided by permanent magnets 34 is varied based on the current supplied to control coil 33. In this way, the voltage induced on exciter armature windings 38 can be regulated. As a result, the voltage supplied to main field winding 42 and resulting voltage induced on main armature winding 36 can be regulated via the current supplied to control coil 33 by control coil controller 14.

During the generate mode, isolated AC-DC converter 18 is connected to convert the AC output voltage of ISG 12 to a DC voltage that is supplied to battery 16 and control coil controller 14. The DC voltage supplied to battery 16 provides charging current to the battery, which is used if AC voltage is unavailable to provide power to control coil controller 14. The DC voltage supplied to control coil controller 14 is selectively applied to control 33 to increase or decrease the output voltage of ISG 12 as desired.

In a motor mode, engine start inverter 24 provides an AC voltage to main armature winding 36 via main output contactors 20b to generate a rotating magnetic field. Excitation provided to main field winding 42 generates a stationary magnetic field (at least initially) that interacts with the rotating magnetic field to cause rotating portion 40 to rotate relative to stationary portion 28. The excitation for main field winding 42 is provided by hybrid field excitation module 32. The magnetic flux provided by permanent magnets 34 does not rotate, so an AC voltage is supplied to control coil 33 in order to induce a rotating magnetic field that will induce an AC voltage on PMG windings 38 while rotating portion 30 is stationary (during initial start-up conditions). Rotating rectifier 38 once again rectifies the AC voltage and provides the rectified voltage to main field winding 42 via DC link bus 41 to generate a magnetic field to interact with the rotating magnetic field provided by main armature winding 36.

When operating in generate mode, flux-regulated PMM 32 takes advantage of the benefits associated with permanent magnets as well as the control offered by control winding 33. In particular, control coil controller 14 selectively applies current to control coil 33 to either increase or decrease the magnetic flux presented to PMG windings 38, thereby allowing the output voltage of IDG 12 to be regulated. A benefit of this approach is instead of three separate machines (e.g., a PMG, an exciter, and a main wound-field synchronous machine), only two machines (e.g., flux-regulated PMM 32 and main wound-field synchronous machine) are required.

Figure 2:
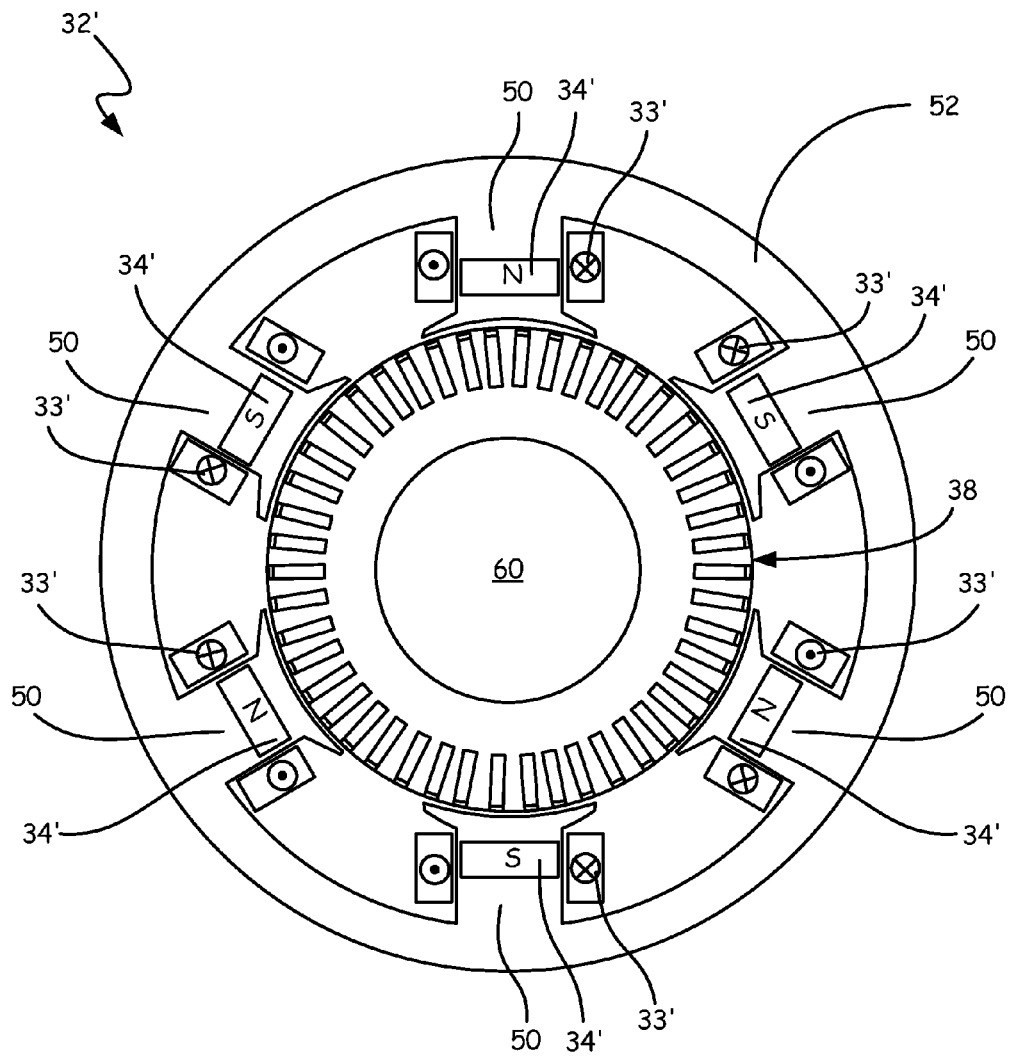
FIG. 2 is a cross-sectional view of a flux-regulated permanent magnet machine (PMM) according to an embodiment of the present invention.

FIG. 2 is a cross-sectional view of flux-regulated PMM 32' according to an embodiment of the present invention. In the embodiment shown in FIG. 2, the stationary portion of flux-regulated PMM 32' includes a plurality of poles 50 extending from ferromagnetic yoke 52, a plurality of permanent magnets 34', and control coil 33'. In addition, rotating armature windings 38, representing the rotating portion of flux-regulated PMM 32', are positioned radially interior the stationary components and are supported by shaft 60. Rotating armature windings 38 are therefore positioned to interact with the magnetic flux provided across the airgap separating rotating and stationary components.

Each of the plurality of poles 50 extends radially inward from ferromagnetic yoke 52, with a permanent magnet 34' positioned on each of the plurality of poles 50. Adjacent permanent magnets 34' are of opposite magnetic polarity, such that magnetic flux is directed from each permanent magnet to its corresponding neighbors via a magnetic circuit path. The amount of magnetic flux depends, in part, on the reluctance associated with the magnetic circuit path. By increasing the reluctance of the circuit path, the magnetic flux presented to rotating armature windings 38 is decreased, and vice versa.

In the embodiment shown in FIG. 2, control coil 33' is wound around each of the plurality of poles 50 and is utilized to selectively vary the magnetic reluctance of the plurality of poles 50. The magnetic flux of coils 33' and flux of permanent magnets 34' are in direct opposition. Application of a control current through control coil 33' increases the reluctance of the plurality of poles 50, and therefore decreases the magnetic flux presented to rotating armature windings 38. Conversely, the magnetic flux presented to rotating armature windings 38 can be increased by decreasing the control current through control coil 33'. The magnetic flux supplied to rotating armature windings 38 is therefore maximized in the embodiment shown in FIG. 2 when the current through control coil 33' is zero, and decreased as current is progressively applied or increased through control coil 33'. In particular, the reluctance for magnetic flux can be expressed by the following equation:

$$\mathfrak{R} = \frac{\ell_{Fe}}{\mu_0 \mu_r(V_c) S_{Fe}} \quad (1)$$

Wherein $\mathfrak{R}$ is the magnetic reluctance, $l_{Fe}$ is the length of a portion of the magnetic circuit, $S_{Fe}$ is the cross section of a portion of the magnetic circuit, $\mu_0 = 0.4\pi \times 10^{-6}$ H/m, and $\mu_r(V_c)$ is the relative magnetic permeability dependent on the control voltage $V_c$. The relative magnetic permeability $\mu_r$ is a nonlinear function of the control voltage $V_c$.

The magnetic flux $\Phi$ in a given portion of the magnetic circuit is inversely proportional to the reluctance $\mathfrak{R}$, as expressed by the following equation:

$$\Phi = \frac{V_\mu}{\mathfrak{R}} \quad (2)$$

Wherein $V_\mu$ is the magnetic potential drop across the length $l_{Fe}$ of the magnetic circuit. Equations 1 and 2 illustrate that the reluctance of poles 50 is a function of the current through control coil 33', and that the magnetic flux is inversely proportional to the reluctance, such that an increase in current through control coil 33' decreases the magnetic flux presented to armature windings 38. A benefit of the embodiment shown in FIG. 2, is that flux (and therefore output voltage of the generator) is maximized when no current is applied to control coil 33'.

Figure 3:
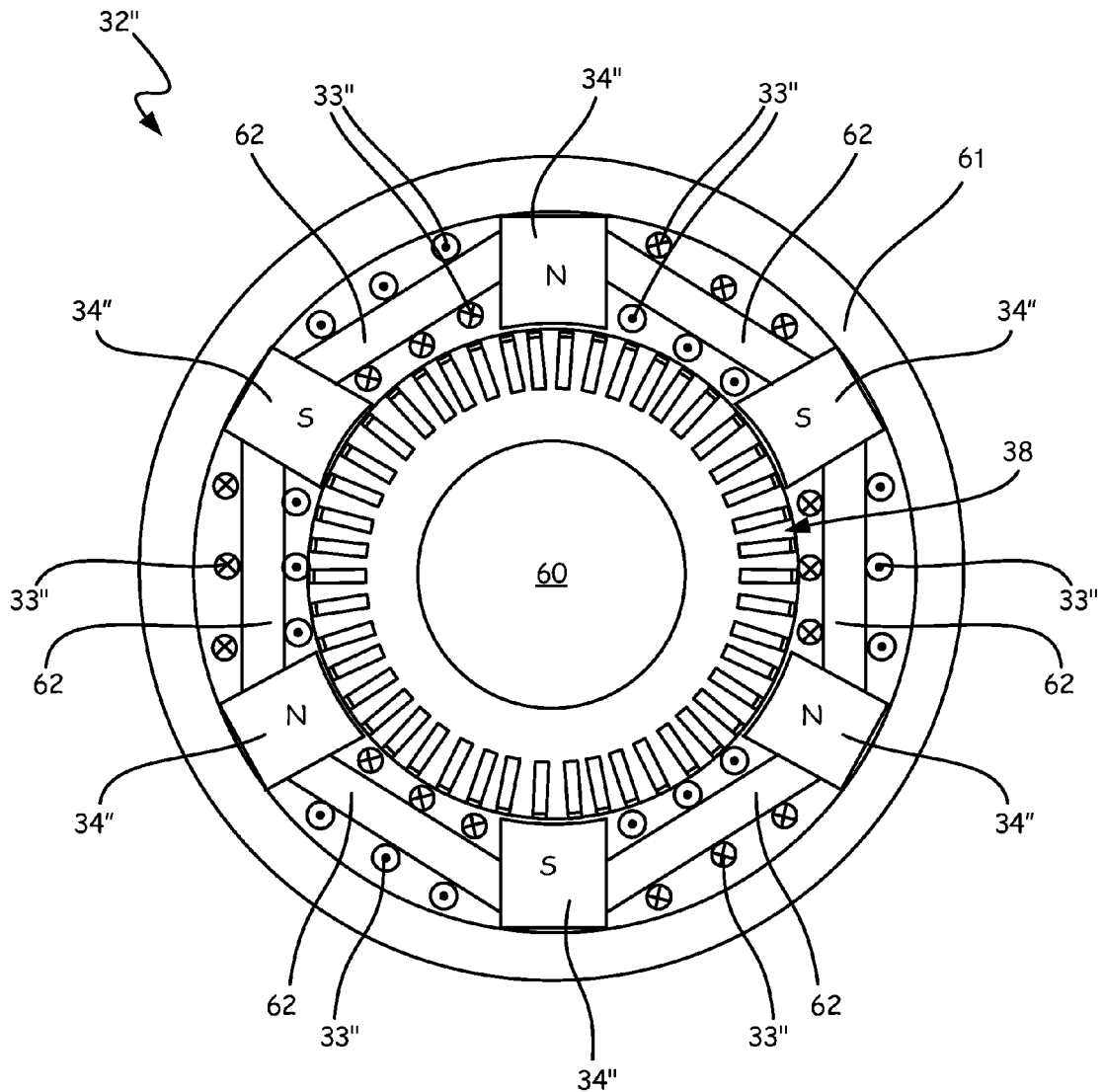
FIG. 3 is a cross-sectional view of a flux-regulated permanent magnet machine (PMM) according to another embodiment of the present invention.

FIG. 3 is a cross-sectional view of flux-regulated PMM 32" according to another embodiment of the present invention. In the embodiment shown in FIG. 3, the stationary portion of flux-regulated PMM 32" includes ferromagnetic yoke 61, a plurality of permanent magnets 34", a plurality of flux diverters (shunts) 62, and control coil 33" wound around flux diverters 62. The plurality of permanent magnets 34" are uniformly distributed around the interior periphery of field excitation module 32", with ferromagnetic yoke 61 magnetically coupling each of the plurality of permanent magnets 34" to one another to form a magnetic circuit path. Rotating armature winding 38 is once again positioned radially interior of permanent magnets 34", and is supported by shaft 60 for rotation.

Flux diverters 62 are connected between adjacent permanent magnets 34", providing a low reluctance path for magnetic flux to travel between adjacent poles. Magnetic flux flowing between adjacent permanent magnets 34" is a "leakage" flux that decreases the magnetic flux presented to rotating armature windings 38. By selectively increasing the reluctance of flux diverters 62, the magnetic flux is re-directed to the airgap between the rotating and stationary portions. The reluctance of flux diverters 62 is dependent, once again, on the control current supplied to control coil 33". By increasing the current through control coil 33", the reluctance of flux diverters 62 is increased. By increasing the reluctance of flux diverters 62, the magnetic flux through each diverter 62 is decreased, and correspondingly the magnetic flux provided to armature windings 38 is increased.

Therefore, in contrast with the embodiment shown in FIG. 2, in which magnetic flux provided to armature winding 38 is maximized when the control current is zero, in the embodiment shown in FIG. 3 the magnetic flux provided to armature winding 38 is maximized when the control current is large (i.e., non-zero) and minimized when the control current is zero. The embodiment described with respect to FIG. 3 is beneficial because it requires a control current in order to maximize the generator output voltage, and therefore maintains the output of the generator at a "safe" level in the event no control current is available (e.g., fault condition).

Discussion of Possible Embodiments

The following are non-exclusive descriptions of possible embodiments of the present invention.

An integrated starter-generator (ISG) system includes a flux-regulated permanent magnet machine (PMM), a wound-field synchronous machine, and a control coil controller. The flux-regulated PMM may include a stationary portion that includes a control coil and a plurality of permanent magnets, and a rotating portion that includes rotating armature windings. The wound-field synchronous machine may include a stationary portion that includes a main armature winding and a rotating portion that includes a main field winding that receives excitation from the flux-regulated PMM. The control coil controller controls current supplied to the control coil of the flux-regulated PMM to selectively control magnetic flux presented to the rotating armature windings.

The ISG of the preceding paragraph can optionally include, additionally and/or alternatively, any one or more of the following features, configurations and/or additional components.

In any of the foregoing embodiments, the stationary portion may be positioned radially exterior to the rotating portion and may further include a ferromagnetic yoke and a plurality of poles extending radially inward from the ferromagnetic yoke toward the rotating portion, wherein each of the plurality of poles includes one of the plurality of permanent magnets, and the control coil is wrapped around each of the plurality of poles.

In any of the foregoing embodiments, the control coil controller may increase the magnetic flux presented to the rotating armature windings by decreasing the current through the control coil.

In any of the foregoing embodiments, the control coil controller may decrease the magnetic flux presented to the rotating armature windings by increasing the current through the control coil.

In any of the foregoing embodiments, the control coil controller may regulate an output voltage generated by the main armature winding by selectively controlling the current through the control coil.

In any of the foregoing embodiments, the stationary portion may be positioned radially exterior to the rotating portion and may further include a ferromagnetic yoke, wherein the plurality of permanent magnets extend radially inward from the ferromagnetic yoke towards the rotating portion, and a plurality of flux diverters connected between each of the plurality of adjacent permanent magnets, wherein the control coil is wound around each of the flux diverters.

In any of the foregoing embodiments, the control coil controller may increase the magnetic flux presented to the rotating armature windings by increasing the current through the control coil.

In any of the foregoing embodiments, the control coil controller may decrease the magnetic flux presented to the rotating armature windings by decreasing the current through the control coil.

In any of the foregoing embodiments, the control coil controller may regulate an output voltage generated by the main armature winding by selectively controlling the current through the control coil.

A flux-regulated permanent magnet machine (PMM) may include a rotating portion and a stationary portion. The rotating portion may include a rotating armature winding. The stationary portion may be positioned radially exterior to the rotating portion and may include a ferromagnetic yoke, a plurality of poles extending radially inward from the ferromagnetic yoke towards the rotating portion, a plurality of permanent magnets, each permanent magnet located on one of the plurality of poles, and a control coil wound around each of the plurality of poles.

In any of the foregoing embodiments, the magnetic flux presented to the rotating armature windings may be increased by decreasing the current through the control coil.

In any of the foregoing embodiments, the magnetic flux presented to the rotating armature windings may be decreased by increasing the current through the control coil.

A flux-regulated permanent magnet machine (PMM) may include a rotating portion and a stationary portion. The rotating portion may further include a rotating armature winding. The stationary portion may be positioned radially exterior to the rotating portion, and may further include a ferromagnetic yoke, a plurality of permanent magnets extending radially inward from the ferromagnetic yoke towards the rotating portion, a flux diverter connected between each of the plurality of adjacent permanent magnets, and a control coil wound around each of the flux diverters.

In any of the foregoing embodiments, the magnetic flux presented to the rotating armature windings may be increased by increasing the current through the control coil.

In any of the foregoing embodiments, the magnetic flux presented to the rotating armature windings may be decreased by decreasing the current through the control coil.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An integrated starter-generator (ISG) system comprising:
   a flux-regulated permanent magnet machine (PMM) that includes a stationary portion that includes a control coil and a plurality of permanent magnets, and a rotating portion that includes rotating armature windings, wherein the stationary portion is positioned radially exterior to the rotating portion and includes:
   a ferromagnetic yoke;
   a plurality of poles extending radially inward from the ferromagnetic yoke toward the rotating portion; and
   a plurality of flux diverters each respectively connected between each of the plurality of adjacent permanent magnets, wherein each of the flux diverters is separate from, and spaced radially inward of, the ferromagnetic yoke, and wherein the control coil is wrapped around each of the flux diverters;

a wound-field synchronous machine that includes a stationary portion that includes a main armature winding and a rotating portion that includes a main field winding that receives excitation from the flux-regulated PMM; and a control coil controller that controls current supplied to the control coil of the flux-regulated PMM to selectively control magnetic flux presented to the rotating armature windings, wherein the control coil controller is configured to provide direct current to the control coil during a generate mode and provide alternating current to the control coil during a motor mode.

2. The ISG system of claim 1, wherein the control coil controller increases the magnetic flux presented to the rotating armature windings by decreasing the current through the control coil.

3. The ISG system of claim 1, wherein the control coil controller decreases the magnetic flux presented to the rotating armature windings by increasing the current through the control coil.

4. The ISG system of claim 1, wherein the control coil controller regulates an output voltage generated by the main armature winding by selectively controlling the current through the control coil.

5. A flux-regulated permanent magnet machine (PMM) comprising:

a rotating portion that includes a rotating armature winding; and a stationary portion positioned radially exterior to the rotating portion, the stationary portion including:
a ferromagnetic yoke;
a plurality of permanent magnets extending radially inward from the ferromagnetic yoke towards the rotating portion;
a plurality of flux diverters connected between each of the plurality of adjacent permanent magnets, wherein each of the flux diverters is separate from, and spaced radially inward of, the ferromagnetic yoke; and
a control coil wound around each of the flux diverters, wherein the control coil is configured to receive, from a control coil controller, a direct current during a generate mode and an alternating current during a start mode.

6. The flux-regulated PMM of claim 5, wherein the magnetic flux presented to the rotating armature windings is increased by increasing the current through the control coil.

7. The flux-regulated PMM of claim 5, wherein the magnetic flux presented to the rotating armature windings is decreased by decreasing the current through the control coil.

* * * * *